United States Patent
Ishikawa et al.

(10) Patent No.: US 7,641,045 B2
(45) Date of Patent: Jan. 5, 2010

(54) TOP PLATE CONVEYOR DEVICE

(75) Inventors: Masayuki Ishikawa, Osaka (JP);
Yasunori Ueno, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 12/245,098

(22) Filed: Oct. 3, 2008

(65) Prior Publication Data
US 2009/0133993 A1    May 28, 2009

(30) Foreign Application Priority Data
Nov. 28, 2007    (JP) ............... 2007-306973

(51) Int. Cl.
*B65G 29/00*    (2006.01)
(52) U.S. Cl. .............. 198/867.15; 198/867.14
(58) Field of Classification Search ............. 198/867.1, 198/867.14, 867.15, 849, 850, 840, 841, 198/842
See application file for complete search history.

(56) References Cited
U.S. PATENT DOCUMENTS

| | | | | |
|---|---|---|---|---|
| 3,202,266 A | * | 8/1965 | Schmermund | ............. 198/850 |
| 4,078,654 A | * | 3/1978 | Sarovich | ................ 198/867.14 |
| 4,084,687 A | * | 4/1978 | Lapeyre | ..................... 198/850 |
| 5,176,247 A | * | 1/1993 | Counter et al. | ............. 198/831 |
| 5,630,499 A | * | 5/1997 | Louden et al. | ......... 198/867.14 |
| 5,890,584 A | | 4/1999 | Bonnet | |

FOREIGN PATENT DOCUMENTS

JP    2002-503193    1/2002

* cited by examiner

*Primary Examiner*—James R Bidwell
(74) *Attorney, Agent, or Firm*—Dann, Dorfman, Herrell and Skillman; Henry H. Skillman

(57) ABSTRACT

A top plate conveyor device, in which vibrations and noises are reduced, and the structure is simple and the production assembly and handling are easy. Top plates 110 are removably provided on a rubber toothed belt 120 by engagement members 111 provided on the back surfaces of the top plates 110, and engagement members 111 include sandwiching portions 112 which sandwich the toothed belt 120 from both outer sides in the width direction and terminate in pawl portions 113, which snap-connect the top plates to the toothed belt 120.

7 Claims, 9 Drawing Sheets

TOP PLATE CONVEYOR DEVICE

FIELD OF INVENTION

The present invention relates to an article transferring top plate conveyor device for transferring articles loaded on top plates.

BACKGROUND OF THE INVENTION

As top plate conveyor devices, a top plate conveyor device has been known in which adjacent top plates are rotatably connected to each other by connecting pins or the like to form a chain shaped-element as a configuration for endlessly connecting a plurality of top plates to each other.

One such device is shown in FIG. 6. A top plate conveyor device 600, has a number of top plates 610 rotatably connected to each other by connecting pins 615 to form an endless chain shape and are formed such that the top plate conveyor device is stretched between sprockets 630 to load articles thereon and convey them. Guide rails 640 are provided along the top, i.e. the conveying portion, of the conveyor to underlie the back surfaces of the chain-shaped top plates 610 to support the article loading surface.

There were such problems in the top plate conveyor device 600 caused by vibrations and noises generated by the rolling of the connecting pins 615, and the contacts between top plates 610 and between the top plate 610 and the sprocket 630, and elongation is generated in the entire chain and breakage is generated, by wear of the connecting pins 615 and the like.

Further, another conveyor device has been known as a high strength conveyor device in which vibrations and noises are low and elongation is not liable to occur. In this device the top surface of an endless belt is made of rubber, such as urethane or the like, and this surface is used as a loading surface and a back surface of the belt is supported by guide rails.

As shown in FIG. 7, the conveyor device 700 is formed such that a toothed belt 720 made of rubber such as urethane or the like is stretched between sprockets 730. Articles P are loaded on the toothed belt 720 to be conveyed. A back surface of the toothed belt 720 has tooth portions 721 where crest portions 722 and valley portions 723 are alternately provided at the equal intervals. Back surfaces for conveying portions in the toothed belt 720 are provided with guide rails 740 for supporting loading surfaces.

Such a conveyor device 700, where rubber such as urethane or the like used in the toothed belt 720 which has a higher frictional coefficient as compared with resin used in the top plates of a usual top plate conveyor device, there were problems that the conveyor device needs large driving force for driving a conveyor due to frictional resistance with a guide rail 740 on a back surface and sliding of accumulated articles on the loading surface is difficult.

To overcome these problems another article transferring top plate conveyor device has been known in which a plurality of top plates are connected to an endless belt.

As shown in FIGS. 8 and 9, the top plate conveyor device 800 is formed such that a plurality of top plates 810 are attached to a surface of an endless belt 820 having longitudinally-space protrusions 826. One end of the top plate 810 in the transfer direction is pivotally connected to another top plate 810 by hinges 817 (see FIG. 9), and the other end of the top plate 810 in the transfer direction is provided with a fitting portion 815, which can be fitted to attached the protrusions 826 in an concave portion/convex portion engagement. Further, on the endless belt 820 has a locking pin receiver 825 between the protrusions 826. The underside of the hinge 817 is provided a locking pin 816, which can be securely fitted into the receiver 825. See Japanese patent publication No. 2002-503193 (on pages 12 to 14, FIGS. 1 to 4).

Problems to be Solved by the Invention

In conventional top plate conveyor devices, either the structure is complicated, causing complications in the production assembly and handling, or the conventional top plate conveyor device has a friction movable portion such as a hinge or the like, causing vibrations or noises to occur, or, when guide rails are provided the back surface of the endless belt is fractionized, causing a problem that large driving force is needed.

The object of the present invention is to solve the above-mentioned prior art problems, by providing a top plate conveyor device, in which vibrations and noises are reduced, elongation is not liable to occur, and the structure is simple and the production assembly and handling are easy and strength is high.

SUMMARY OF THE INVENTION

Means for Solving the Problems

The invention solves the above-mentioned problems by an article transferring top plate conveyor device having a toothed belt made of rubber and top plates removably secured to said toothed belt by engagement members in which back surfaces of the article loading top plates are supported by guide rails. The engagement members include sandwiching portions provided on back surfaces of said top plates, which portions sandwich the toothed belt from both outer sides in the width direction and include pawl portions, which snap-connect to said toothed belt so that said engagement members embrace said toothed belt to engage with it.

One embodiment of the invention solves the above-mentioned problems by forming the engagement members such that each of said engagement members engages with a valley portion of said toothed belt.

A second embodiment of the invention solves the above-mentioned problems by forming the engagement members such that each of the engagement members engages with a crest portion of said toothed belt.

The invention solves the above-mentioned problems by forming the top plates such that back surfaces of the article loading top plates are supported by guide rails on both right and left outer sides of said engagement members in the width direction.

Effects of the Invention

When the top plate conveyor device of the present invention has a toothed belt made of rubber and top plates each removably secured to the toothed belt by engagement members and the back surfaces of the article loading top plates are supported by guide rails, vibrations and noises can be reduced and the generation of elongation can be also prevented. Additionally the following peculiar effects can be obtained.

In the top plate conveyor device of each embodiment of the present invention, said engagement members include sandwiching portions provided on back surfaces of said top plates, which sandwich the said toothed belt from both outer sides in the width direction and pawl portions, which snap-connect to said toothed belt by pawls on the front side of the sandwiching portions so that said engagement members embrace said toothed belt to engage with it, the structure of the top plate conveyor device is simple and the top plates and the toothed belt can be reliably secured to each other to form a substantially continuous loading surface. Thus the production assembly and handling of the top plate conveyor device become easy and the structure thereof in which strength is not decreased and damage is not liable to occur can be obtained.

In the top plate conveyor device of one embodiment of the invention, said engagement members are formed such that each of said engagement members engages with a valley portion of said toothed belt, the engagement members can be shortened and the top plates can be miniaturized. Thus the production assembly and handling of the top plate conveyor device further become easy.

In the top plate conveyor device of a second embodiment of the invention, said engagement members are formed such that each of said engagement members engages with a crest portion of said toothed belt, a distance of the engagement portion to a front end pawl portion can be made longer. Thus even if rigidity of the top plate is enhanced, the elasticity for snap connection between sandwiching portions of the engagement portions can be acquired so that the production assembly and handling of the top plate conveyor device become easy.

When in each embodiment of the top plate conveyor device, said top plates have overhanging side edge portions which extend beyond the outer sides of the toothed belt, and the back surfaces of the overhanging portions of the article loading top plates are supported by guide rails on both right and left outer sides of said engagement members in the width direction. The guide rails slidably support the undersurfaces of the overhanging portions of the top plates, which are of a rigid material which has a small friction coefficient. Thus vibrations and noises are reduced and at the same time necessary driving force can be decreased.

DESCRIPTION OF THE PREFERRED EMBODIMENTS

The figures illustrate article transferring top plate conveyor devices having a toothed belt made of rubber or other flexible materials and top plates. The plates are supported by guide rails, and are removably secured to the toothed belt by engagement members depending from back surfaces of the top plates. The engagement members include sandwiching portions provided on back surfaces of said top plates, which sandwich said toothed belt from both outer sides in the width direction, and pawl portions which snap-connect to said toothed belt on the confronting sides of the sandwiching portions so that said engagement members embrace said toothed belt to engage with it. The top plate conveyor device of the present invention exhibits effects that a structure of the top plate conveyor device is simple, the production assembly and handling thereof are easy and a top plate conveyor having high strength is formed, any specific embodiments of the top plate conveyor device of the present invention may be adopted.

The specific materials of the top plate used in the present invention is rigid, light weight and provide a low-friction loading surface, for example, resin and metal may be preferably used since, when they are used, vibrations and noises are reduced and elongation is not liable to occur. The top plate conveyor device of the present invention exhibits effects that its structure is simple, its production assembly and handling are easy and a top plate conveyor having high strength is formed. Particularly, use of resin top plates is more preferable since the resin top plate is light weight, provides low-friction loading surface, and has excellent workability and vibrations and noises can be more reduced.

As specific materials of the flexible toothed belt used in the present invention, any materials may be used if they have excellent flexibility and endurance. For example materials such as a urethane rubber and the like are preferable. Alternatively, materials including wire rods of metal, Kevlar and the like as a core material may be used, or laminated materials may be also preferably used.

Figure 1:
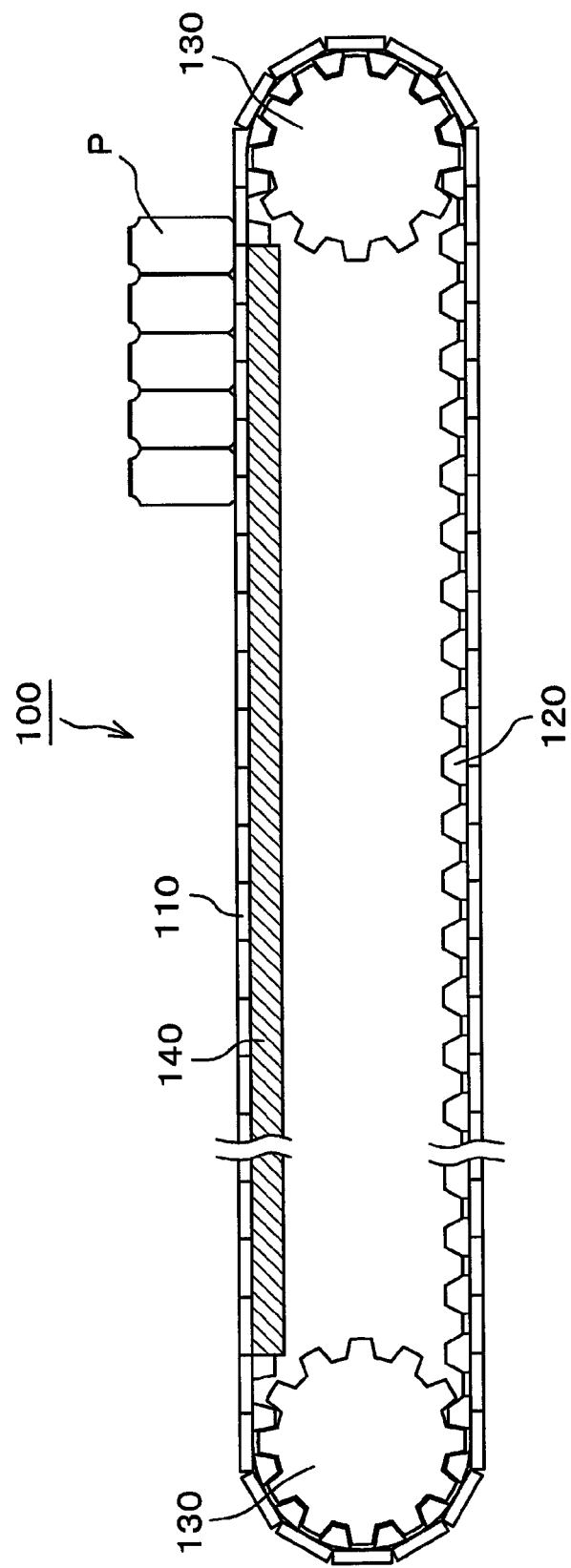
FIG. 1 is a view of a top plate conveyor device embodying the present invention.
Figure 2:
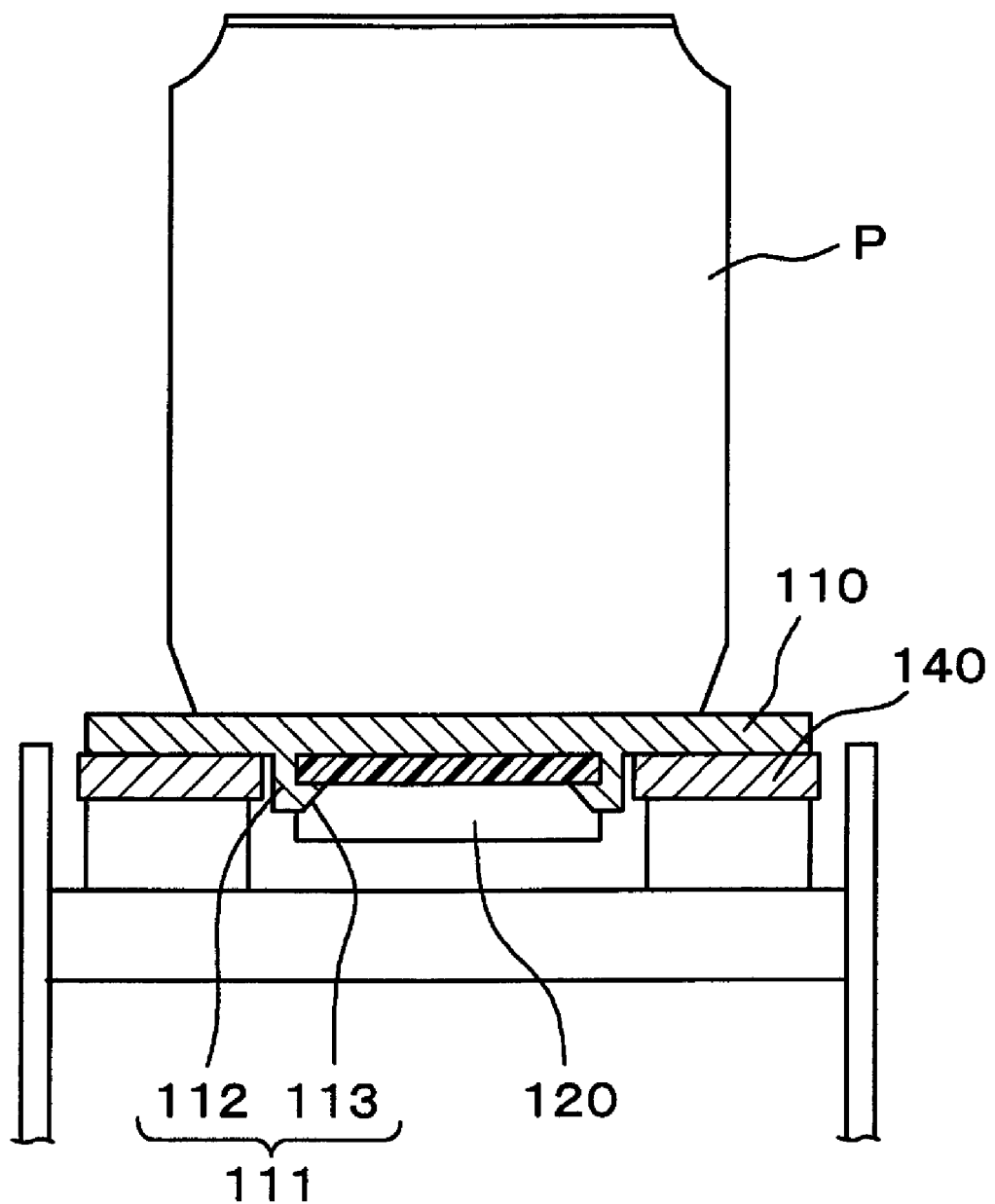
FIG. 2 is a cross-sectional view of the top plate conveyor device illustrating a first embodiment of the present invention.
Figure 3:
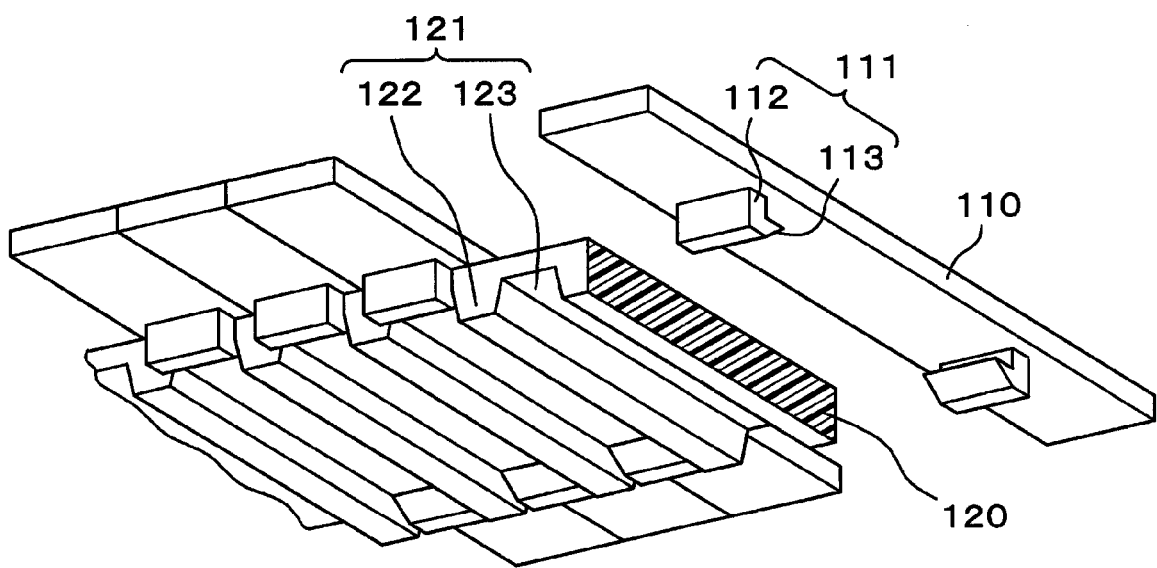
FIG. 3 is a partial perspective view of the top plate conveyor device shown in FIG. 2.

Referring to FIGS. 1-3, a top plate conveyor device 100, which is a first embodiment of the present invention, is formed such that a number of top plates 110 are engaged with a toothed belt 120 to provide an endless a chain-shaped member which circularly travels between two sprockets 130, as shown in FIG. 1.

The upper surface of the top plate conveyor device 100 is used as a loading surface for conveying articles P. Guide rails 140 come into sliding contact with overhanging side portions of the traveling top plates 110 to support them thereby ensuring flatness of the loading surface. The guide rails 140 are provided on both right and left outer sides in a width direction of the top plate conveyor device 100 as shown in FIG. 2. There is a small space between the adjacent side of the of the belt 120 and each guide rail 140. The guide rails 140 come into sliding contact with back surfaces of the overhanging side portions of the top plates 110. Between the side portions, outside of right and left engagement members 111 depend into the small space on each side of the belt 120.

In the first embodiment of the present invention, the engagement member 111 is engaged with a valley portion 123 of a toothed belt 120, as will be explained in detail below.

As shown in FIGS. 2 and 3, the back surface of the loading surface of the top plate 110 of the top plate conveyor device 100, in the first embodiment of the present invention, is vertically provided with the depending engagement member 111, which engages with the toothed belt 120.

The engagement member 111 includes a sandwiching portion 112, which sandwiches the toothed belt 120 from both its outer sides in the width direction together with the sandwiching portion 112 of the other engagement member, and includes a pawl portion 113, which is snap-fitted to the toothed belt 120 on a belt-confronting side of the sandwiching portion 112. On the other hand, particularly as shown in FIG. 3, a back surface of the toothed belt 120 includes a tooth portion 121 composed of a crest portion 122 and a valley portion 123.

The length of the sandwiching portion 112 is set to the thickness of the valley portion 123 of the toothed belt 120, and the valley portion 123 of the toothed belt 120 is sandwiched by the sandwiching portions 112 from both outer sides in the width direction. At the same time the pawl portions 113 are snap-connected to the toothed belt 120 so that a thickness direction of the toothed belt 120 is also secured and the top plate 110 which embraces the toothed belt 120 with engagement members 111 as a whole. As a result the top plates 110 and the toothed belt 120 are strongly secured to each other.

Since the thus obtained top plate conveyor device 100 has no friction-creating movable portions, such as a hinge and the like, except for sliding contact portion between the top plate 110 and the guide rails 140, the generation of vibrations and noises is reduced and there are no generation of elongation in the entire chain or breakage of the chain, due to friction and the like. Furthermore, as shown in FIG. 1, the engagement members mount the top plates in endwise alignment along the upper surface of the top run of the belt 220, to provide a substantially continuous top loading surface. There is minimum clearance between adjacent top plates which is sufficient to allow the toothed belt 120 to be frictionlessly trained around the sprockets 130 and any guides which may be provided for the return run of the belt between the sprockets.

As materials for the loading surface of the top plate 110 for articles P a slippery material can be selected, and accumulation of products on the loading surface can be easily performed.

Since the top plate 110 has such a simple structure that the engagement members 111 are only vertically provided on the back surface of the top plate 110, production, transfer and handling of the top plate 110 are very easy. And since the top plates 110 are snap-connected to the toothed belt 120, assembling of the entire top plate conveyor device becomes very easy. Thus the beneficial effects of the first embodiment of the present invention are very large.

Figure 4:
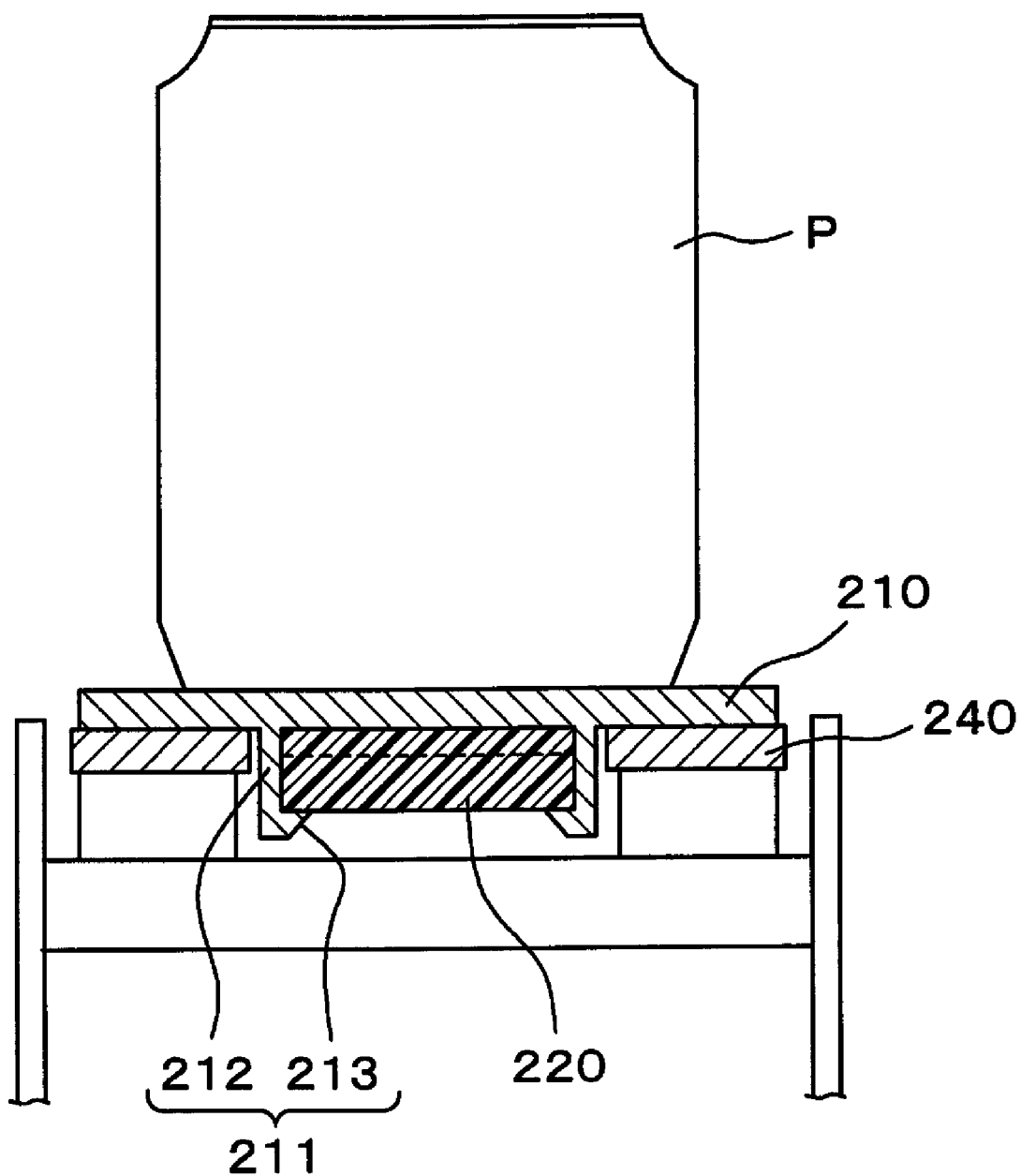
FIG. 4 is a cross-sectional view of a top plate conveyor device illustrating a second embodiment of the present invention.
Figure 5:
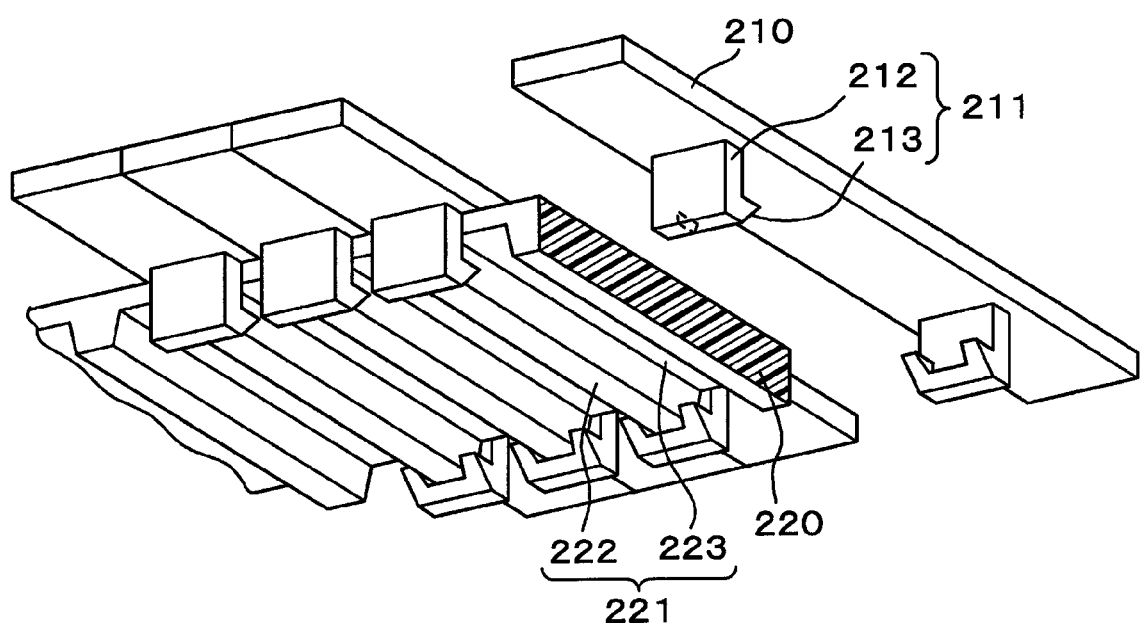
FIG. 5 is a partial perspective view of the top plate conveyor device shown in FIG. 4.
Figure 6:
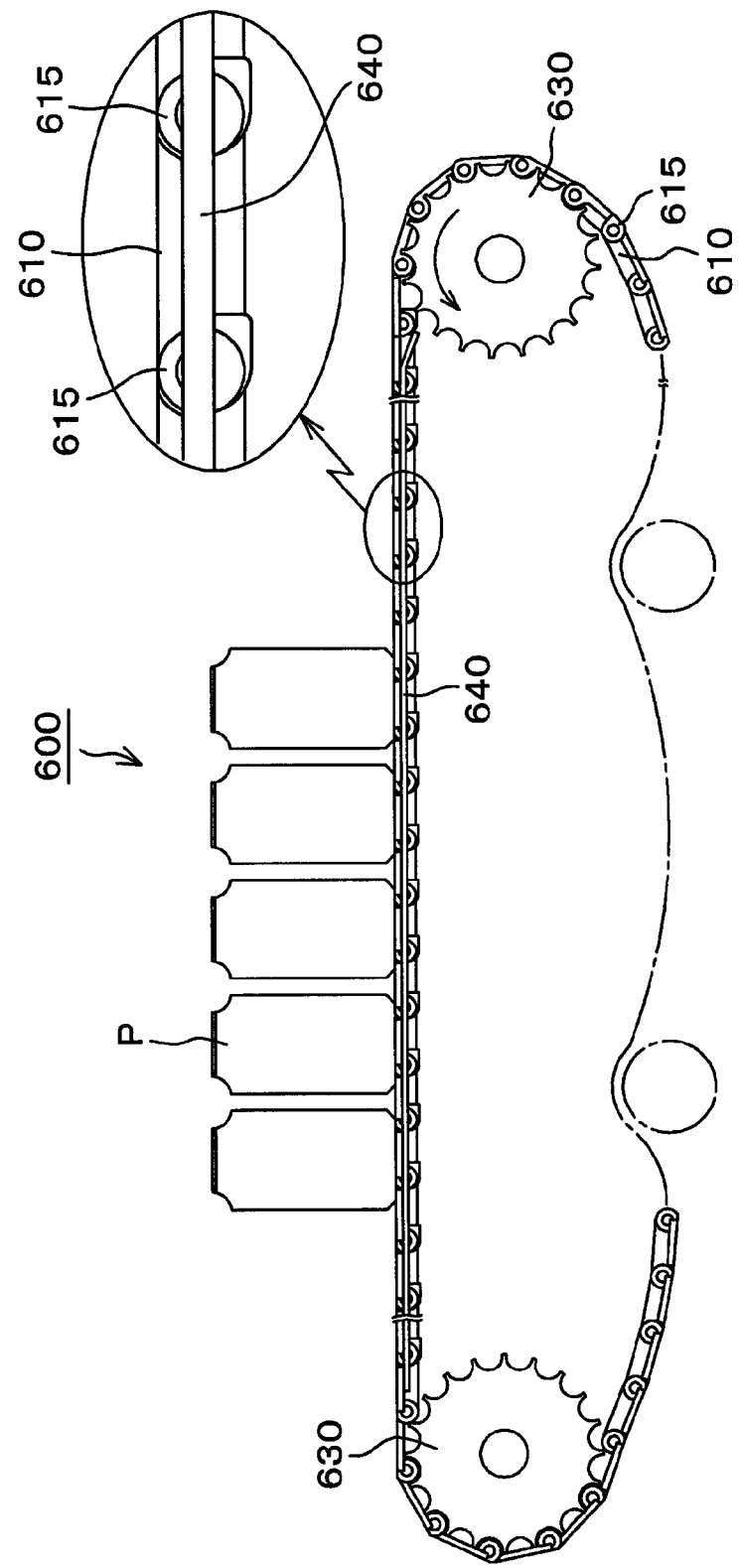
FIG. 6 is a view of one conventional top plate conveyor device, with an enlarged detail of the encircled portion showing an individual top plate and its supporting pins.
Figure 7:
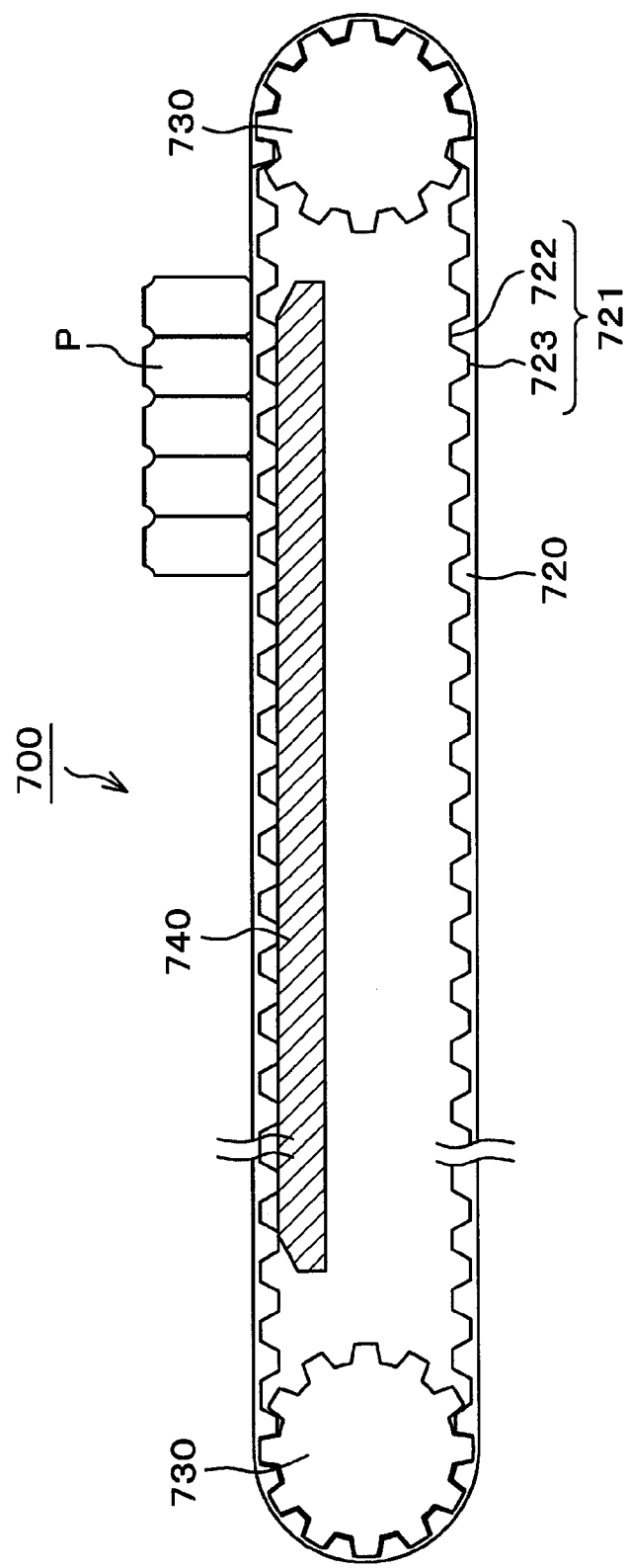
FIG. 7 is a view of a second conventional endless belt conveyor device showing a guide trail for supporting the conveyor belt between sprockets.
Figure 8:
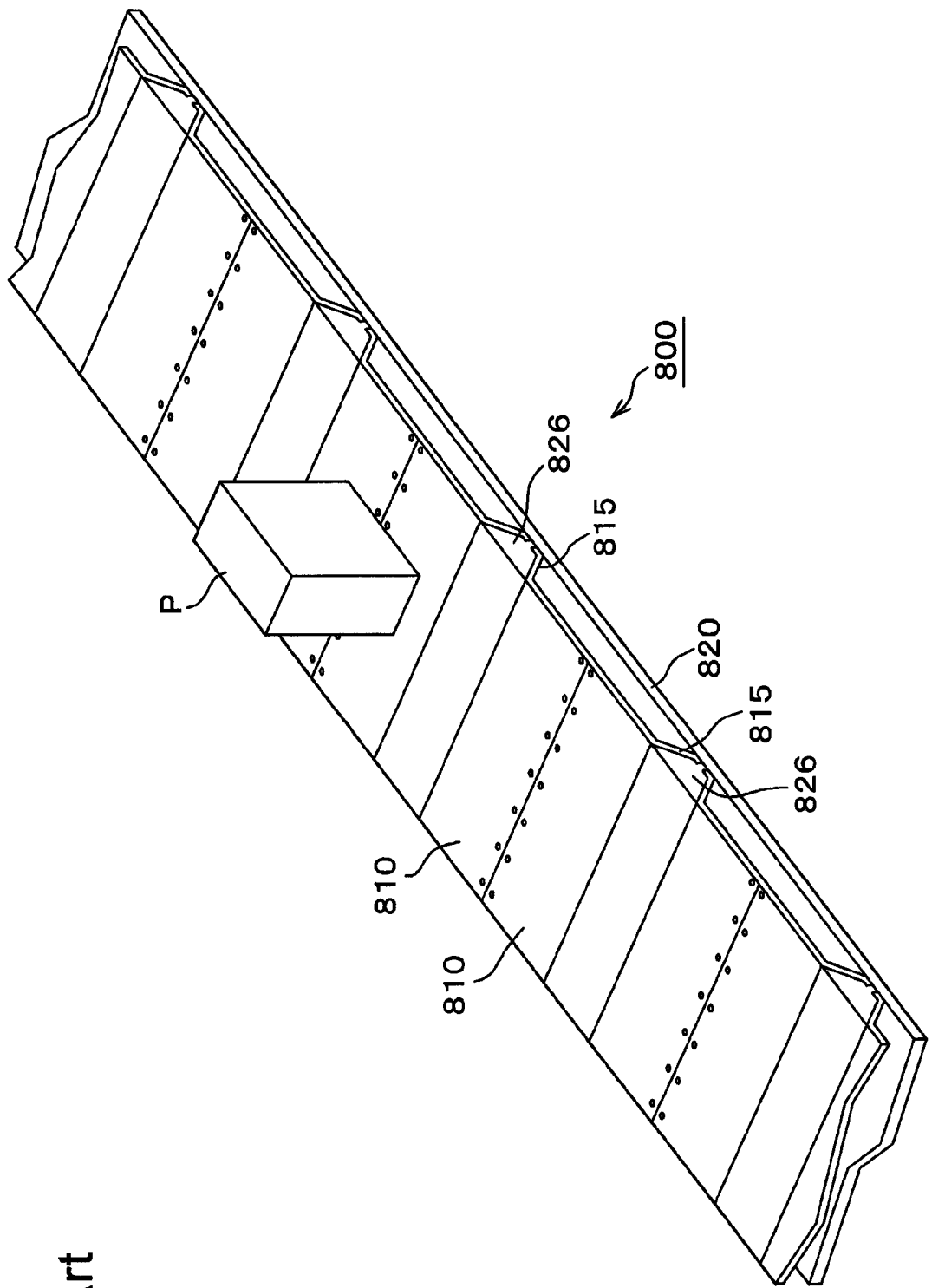
FIG. 8 is a view of a third conventional belt-combined top conveyor device.
Figure 9:
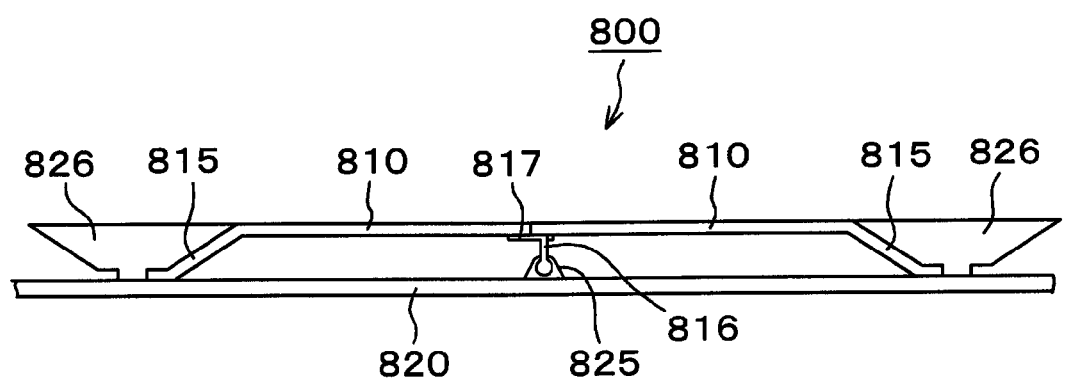
FIG. 9 is a partial side view of the conventional belt-combined top conveyor device shown in FIG. 8.

A second embodiment of the present invention is illustrated in FIGS. 4 and 5. In this embodiment, a top plate 210 of a top plate conveyor device 200, is engaged with a crest portion 222 of a toothed belt 220.

The top plate 210 of the top plate conveyor device 200 in this second embodiment of the present invention, is vertically provided with engagement members 211, which engage with the toothed belt 220 on a back surface of a loading surface where articles P are loaded.

The engagement member 211 includes a sandwiching portion 212, which sandwiches the toothed belt 220 from both its outer sides in the width direction together with the other sandwiching portion 212, and includes a pawl portion 213, which is snap-fitted to the toothed belt 220 on the confronting side of the sandwiching portion 212. As shown in FIG. 5, the back surface of the toothed belt 220 includes a tooth portion 221 composed of a crest portion 222 and a valley portion 223.

The length of the sandwiching portion 212 is set to the thickness of the crest portion 222 of the toothed belt 220, and the crest portion 222 of the toothed belt 220 is sandwiched by the sandwiching portions 212 from both outer sides in the width direction. At the same time the pawl portion 213 is snap-connected to the toothed belt 220 so that a thickness direction of the toothed belt 220 is also secured and the top plate 210 embraces toothed belt 220 with engagement members 211 as a whole. As a result the top plates 210 and the toothed belt 220 are strongly secured to each other.

It is noted that the pawl portion 213 is provided with a cut-out portion, which engages with a front end of a crest portion 222 of the toothed belt 220, so that the top plates 210 and the toothed belt 220 are also strongly secured to each other in the belt advancing direction. As in the first embodiment, the top plates 210 are aligned along the length of the loading surface with minimum clearance between adjacent top plates to provide a substantially continuous loading surface.

Since the thus obtained top plate conveyor device 200 has no friction movable portions such as an hinge and the like, except for sliding contact portion between the top plate 210 and the guide rails 240, the generation of vibrations and noises is reduced and there are no generation of elongation in the entire chain or breakage of the chain, due to friction and the like.

As materials of the loading surface of the top plate 210 for articles P a slippery material can be selected, and product accumulation on the loading surface can be easily performed.

The top plate 210 has such a simple structure that the engagement members 211 are only vertically provided on the back surface of the top plate 210, so that production, transfer and handling of the top plate conveyor device 200 are very easy. Since the top plates 210 are snap-connected to the toothed belt 220, assembling of the entire top plate conveyor device becomes very easy.

In this embodiment, the length of the sandwiching portion 212 is set to the thickness of the crest portion 222 of the toothed belt 220, and even if the top plate 210 is made of high rigidity material, elasticity for snap-connection can be sufficiently ensured and assembling of the entire top plate conveyor device becomes more easily and the like. Since the belt is made of a resilient material, the pawls do not need to be displaced by the snap-in operation for assembling the top plates to the belt. As a result the beneficial effects of the second embodiment are very large.

While particular embodiments of the invention have been illustrated and described changes and modifications made be therein and thereto within the scope of the inventions, as defined by the appended claims.

The invention claimed is:

1. An article transferring top plate conveyor device having a flexible toothed belt, at least one guide rail disposed alongside said belt, and top plates having dependent engagement members adapted to removably secure the associated top plate to said toothed belt, said top plates having at least one overhanging portion to overlie said guide rail whereby the undersurface of the overhanging portion is supported by said guide rails, wherein said engagement members include a pair of sandwiching portions depending from the back surface of each said top plate, which sandwich said toothed belt from both outer sides in the width direction, said sandwich portions terminating in pawl portions projecting toward each other, which snap-connect to said toothed belt so that said engagement members embrace said toothed belt to and anchor said top plate to said toothed belt.

2. A top plate conveyor device according to claim 1, wherein the underside of the toothed belt has crest portions alternating with valley portions, characterized in that said engagement members are formed such that the pawl portions of each of said engagement members engages with a valley portion of said toothed belt.

3. A top plate conveyor device according to claim 2, wherein there is a separate top plate for each valley, the upper surfaces of said top plates being coplanar to provide a substantially continuous loading surface.

4. A top plate conveyor device according to claim 1, wherein the underside of the toothed belt has crest portions alternating with valley portions, characterized in that said engagement members are formed such that the pawl portions of each of said engagement members engages with a crest portion of said toothed belt.

5. A top plate conveyor device according to claim 4, wherein there is a separate top plate for each crest, the upper surfaces of said top plates being coplanar to provide a substantially continuous loading surface.

6. A top plate conveyor device according to claim 1, wherein there is one at least one guide rail on both right and left outer sides of said toothed belt, said top plates having an overhanging portion overlying each guide rail, so that the back surfaces of the article loading top plates are supported by guide rails on both right and left outer sides of said engagement members in the width direction.

7. A top plate conveyor device according to claim 1, wherein said flexible toothed belt is made of rubber, and said top plates are rigid, light weight and provide a low-friction loading surface which is substantially continuous when supported by said guide rails.

* * * * *